US012406268B1

United States Patent
Jones, Jr. et al.

(10) Patent No.: US 12,406,268 B1
(45) Date of Patent: Sep. 2, 2025

(54) NON-FUNGIBLE TOKEN TRANSACTION MANAGEMENT SYSTEMS AND METHODS (71) Applicant: United Services Automobile Association (USAA), San Antonio, TX (US)

(72) Inventors: David M. Jones, Jr., San Antonio, TX (US); Joel S. Hartshorn, Port Orchard, WA (US); Nolan Serrao, Plano, TX (US); Jennifer Hunt Erickson, San Antonio, TX (US); Subhalakshmi Selvam, Allen, TX (US); David Patrick Dixon, Boerne, TX (US); Kevin Kenneth Fiedler, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 135 days.

(21) Appl. No.: 17/823,278

(22) Filed: Aug. 30, 2022

Related U.S. Application Data (60) Provisional application No. 63/238,880, filed on Aug. 31, 2021.

(51) Int. Cl.
*G06Q 30/018* (2023.01)
*G06Q 40/08* (2012.01)

(52) U.S. Cl.
CPC ........... *G06Q 30/018* (2013.01); *G06Q 40/08* (2013.01)

(58) Field of Classification Search
CPC .............................. G06Q 30/018; G06Q 40/08
See application file for complete search history.

(56) References Cited

U.S. PATENT DOCUMENTS

| | | | |
|---|---|---|---|
| 9,405,945 B1* | 8/2016 | Diorio | G06K 7/10227 |
| 2010/0235250 A1* | 9/2010 | Bar-Levav | G06Q 20/208 |
| | | | 705/16 |
| 2017/0104592 A1* | 4/2017 | Merdinger | H04L 9/0819 |
| 2022/0058646 A1* | 2/2022 | Oh | G06Q 20/065 |
| 2023/0033434 A1* | 2/2023 | Giang | G06Q 20/3827 |
| 2023/0043095 A1* | 2/2023 | Milam | H04L 9/3247 |

OTHER PUBLICATIONS

"The Coming Blockchain Revolution in Consumption of Digital Art and Music: The Thinking Lawyer's Guide to Non-Fungible Tokens (NFTs)," https://www.klgates.com/The-Coming-Blockchain-Revolution-in-Consumption-of-Digital-Art-and-Music-The-Thinking-Lawyers-Guide-to-Non-Fungible-Tokens-NFTs-3-25-2021. (Year: 2021).*
"The Coming Blockchain Revolution in Consumption of Digital Art and Music: The Thinking Lawyer's Guide to Non-Fungible Tokens (NFTs)," https://www.klgates.com/The-Coming-Blockchain-Revolution-in-Consumption-of-Digital-Art-and-Music-The-Thinking-Lawyers-Guide-to-Non-Fungible-Tokens-NFTs-3-25-2021. (Year: 2021).*

* cited by examiner

*Primary Examiner* — Elizabeth H Rosen
(74) *Attorney, Agent, or Firm* — Fletcher Yoder, P.C.

(57) ABSTRACT

The present application generally relates to a non-fungible token management system that manages transactions involving non-fungible tokens. In an embodiment, the non-fungible token management system may generate insurance policies for non-fungible tokens. The insurance policy can be based on storage risks of non-fungible token associated content. For example, the associated content may include digital data stored outside of a distributed ledger.

9 Claims, 7 Drawing Sheets

NON-FUNGIBLE TOKEN TRANSACTION MANAGEMENT SYSTEMS AND METHODS

CROSS-REFERENCE TO RELATED APPLICATION

This application claims priority to and the benefit of U.S. Provisional Application No. 63/238,880 entitled "NON-FUNGIBLE TOKEN TRANSACTION MANAGEMENT SYSTEMS AND METHODS," filed Aug. 31, 2021, which is hereby incorporated by reference in its entirety for all purposes.

BACKGROUND

The present disclosure relates generally to systems and methods related to non-fungible tokens. More specifically, the techniques discussed herein relate to management of digital transactions involving non-fungible tokens.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A non-fungible token (NFT) is a unit of data that may be stored in a distributed ledger and that is unique and/or noninterchangeable such that unique identity and ownership can be confirmed. NFTs can encompass digital artworks (e.g., images and/or audio data), digital collectibles, assets or inventory of video games, or programs or instructions to generate physical products by way of example. As the NFT marketplace grows, owners would benefit from management platforms for NFTs.

BRIEF DESCRIPTION

Certain embodiments of the present disclosure include a non-fungible token management system that a memory storing executable instructions and includes one or more processors configured to execute the instructions to receive a request to manage a non-fungible token from an owner of the non-fungible token; request information relating to the non-fungible token from a distributed ledger; authenticate ownership of the non-fungible token based on the information; access associated content of the non-fungible token, wherein the associated content comprises digital data stored outside of the distributed ledger and wherein a storage location of the associated content of the non-fungible token is determined based on the information; and generate an insurance policy for the non-fungible token based on the associated content and the storage location.

Certain embodiments of the present disclosure also include a method that includes registering a non-fungible token as a record in a distributed ledger, wherein the non-fungible token comprises digital data that is associated with the record in the distributed ledger; determining a uniqueness of the non-fungible token; generating a notification related to the uniqueness of the non-fungible token; and associating the notification with the non-fungible token.

Certain embodiments of the present disclosure also include a non-fungible token management system that includes a memory storing executable instructions and processing circuitry configured to execute the instructions to receive a request to manage a non-fungible token, wherein the non-fungible token comprises digital image data that is associated with the record in the distributed ledger; access associated content of the non-fungible token, wherein the associated content comprises the digital image data that is stored outside of the distributed ledger; compare the digital image data to other associated content of other non-fungible tokens comprising other digital image data; generate a set of closest match digital images from the other digital image data based on the comparing; and cause the set to be displayed together with the digital image data.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium"

refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed toward non-fungible token (NFT) management techniques that facilitate valuation, authentication, insurance, exchange, and/or storage of NFTs. As additionally discussed herein, the present techniques may include NFT uniqueness identification or assessment for a potential owner of an NFT as well as monitoring of unauthorized copies of NFTs in circulation. In an embodiment, the NFT management system may operate as an insurer and clearinghouse for NFTs and allow for creation and authentication of such property. In an embodiment, the system can scan known marketplaces to provide a uniqueness metric of an NFT or at least a likelihood of uniqueness. By providing a uniqueness assessment for NFTs in different fields, valuation may be applied across a marketplace. Such confirmations may be based on scanning a blockchain and identifying signatures or other information in appropriate blocks, which can eliminate fakes with slightly modified blockchains. This may then be communicated to potential purchasers to facilitate decision making.

While certain NFTs may be authenticated, e.g., to a highest authenticity rating such as 100% authenticity, there may be varying levels of authenticity, which will impact insurance calculations. In such situations an analysis engine may take into account authenticity likelihood value less than 100%, which may be an acceptable level of risk for certain purchasers, especially in view of available insurance. Artificial intelligence or machine learning may be employed as part of uniqueness analysis to scan other NFT files to generate uniqueness metrics. Accordingly, the disclosed embodiments may employ machine learning as part of the NFT management transaction and determinations. The system may include a portal to allow access to a marketplace, authentication data, insurance information, and insurance purchasing.

In an embodiment, the NFT management system provides a unique authentication stamp (which may be physical or virtual) that electronically, visually, and/or physically identifies a product as having been authenticated by a trusted provider. The stamp may be encrypted and may use a public/private key to allow confirmation. Ownership confirmation may also be done via public/private key. Further, ownership may be demonstrated with visual data (e.g., an owner posing with the NFT and/or stamp of authentication) and/or timestamp data that is incorporated into a blockchain. A physical stamp may include circuitry (in addition to physical uniqueness) that incorporates authentication data that is specific to the NFT (or NFTs) and allows scanning to identify/authenticate the NFT.

The disclosed management systems can create confidence in secondary marketplaces for NFTs and also a marketplace for insuring authenticity or insuring against possible loss. Insuring against possible loss may involve analysis of storage scenarios and storage system integrity (e.g., security from hacking, loss of power, natural disaster) for NFT-associated files.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized.

Figure 1:
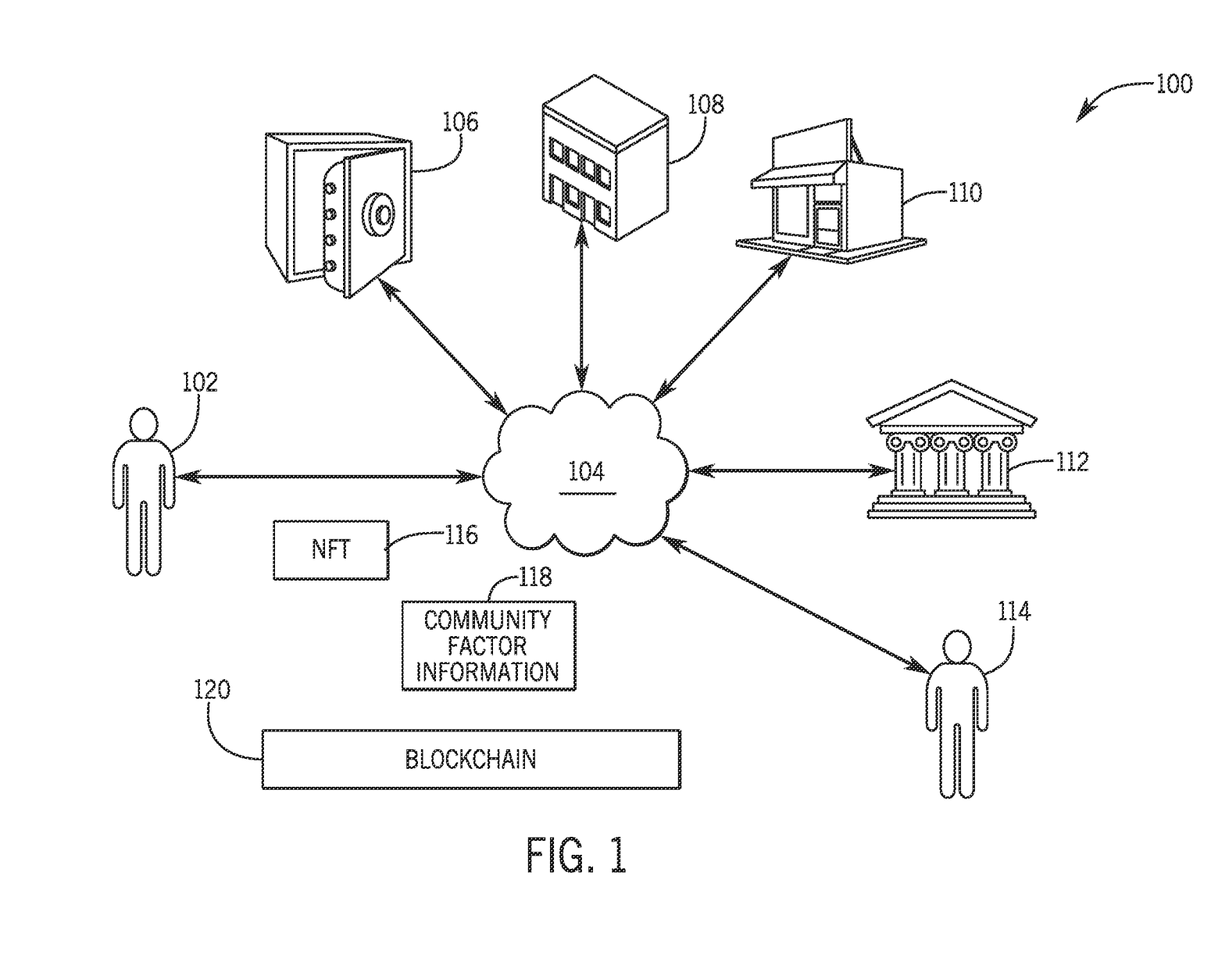
FIG. 1 is a schematic illustration of an environment in which a non-fungible token management system may operate, in accordance with an embodiment.

With the foregoing in mind, the present disclosure details various embodiments for NFT management. FIG. 1 illustrates an example environment 100 in which a non-fungible token (NFT) management system 104 may operate, in accordance with embodiments described herein. A user 102 can interact with and access the NFT management system 104 via a user device 105. The management system 104 may provide NFT management services to a large number of different organizations or individuals, and may act as a clearinghouse for various types of NFT transactions. For example, the NFT management system 104 may permit one or more NFT transactions of the user 102, a cloud storage system 106, companies and institutions 108, merchants and retailers 110, financial institutions 112, and other users 114. The system 104 facilitates interactions with one or more NFTs 116, which may be stored in the system 104, transferred via the system 104, accessed via the system 104, valued by the system 104, insured via the system 104, and/or authenticated by the system 104.

In some embodiments, the NFT management system 104 may facilitate user authentication, which is a technology area that deals with identifying individuals in a system (such as a country, a network, or an enterprise) and controlling access to resources, such as managed NFTs 116, within that system by associating user rights and restrictions with user-associated NFTs and permitting user transactions with NFTs that are owned by the user or that are permitted by an owner of an NFT, which may be facilitated in the system 104. In general, the NFT management system 104 may maintain user information for the user 102, companies and institutions 108, merchants and retailers 110, financial institutions 112, other users 114, and the like. In addition, the system facilitates and maintains NFT identification information and NFT digital data, which can be under user control.

Some of the features that may be provided by the NFT management system 104 includes access to NFT transactions from a mobile application, an embedded application operating on the user device 105, or a web application. In certain embodiments, the NFT management system 104 may securely store identity attributes of an NFT 116 on a blockchain.

As provided herein, an NFT 116 is a token used to represent ownership of one or more unique items. Accordingly, the NFT 116 may refer to a blockchain address or hash associated with the NFT 116 that includes a fixed number of alphanumeric characters generated from a public and private key pair. The NFT 116 may also include digital raw or compressed data representative of the NFT 116 and that is associated with a unique blockchain address. As provided herein, the system 104 may store the identifier hash, while the digital data of the NFT 116 is stored elsewhere, e.g., the digital data of the NFT (e.g., the image data, the audio data) is stored off-chain. In embodiments, the system 104 also stores the digital data of the NFT 116. The NFT 116 may also include metadata (e.g., a JSON file) associated with the digital NFT data. Ownership of the NFT 116 may include ownership of hex values encoding transaction elements, such as function names, parameters, and return values, and that are used to access NFT data.

The NFT 116 may, in embodiments, be a type of cryptocurrency that uses smart contracts. However, in contrast to digital coins, which are fungible, each NFT 116 is digitally unique such that no two NFTs 116 are the same. For example, even for items that are multiples of one another (e.g., multiple digital copies of an artwork), each NFT 116 would still have a unique identifier (e.g., a bar code), with only one owner. The intended scarcity of the NFT 116 is set by the creator. A creator may intend to make each NFT 116 completely unique to create scarcity or produce several thousand replicas (each replica having its own unique, non-fungible identifier, similar to an artist print marked as 1/10). Every NFT 116 has an owner of public record that can be verified. In embodiments, NFT creators can retain ownership rights over their own work, and claim resale royalties directly. Thus, the owner of the NFT 116 may have financial arrangements or royalty arrangements that are dictated within the smart contracts of the NFT record.

Creation or minting of an NFT 116 involves confirmation of the NFT 116 as an asset on the blockchain, and the owner's account balance is updated to include that asset. This makes it possible for the NFT 116 to then be traded or verifiably owned. The transactions that confirm the above are added to a block on the chain. The block is confirmed by everyone in the network as correct. This consensus removes the need for intermediaries because the network verifies the NFT 116 and ownership. As provided herein, the NFT 116 may be created on the Ethereum blockchain. In an embodiment, the NFT 116 is part of the ERC-721, ERC-1155, and/or EIP-2309 standard.

The NFT management system 104 may employ a blockchain infrastructure to perform NFT management utilized in connection with digital transactions such as NFT minting (e.g., NFT creation), authentication, storage, or financial transactions (e.g., NFT purchasing or exchange, valuation, insurance). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database for transactions that involve NFTs.

As such, the embodiments described herein include methods and systems for deployment, maintenance, and interaction with the distributed ledgers and smart contracts to facilitate NFT management for the purpose of performing digital transactions (e.g., financial transactions, exchanges of information). The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions involving NFTs 116. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 1, in certain embodiments, the blockchain 120 may be a public or private ledger of all transactions that have been executed in one or more contexts (e.g., negotiable instrument transactions, digital currency transactions, access determinations, instances of providing access, reviews, etc.). The blockchain 120 may grow as completed blocks are added with a new set of transactions by the NFT management system 104. In certain embodiments, a single block is provided from multiple transactions (e.g., multiple statements of authenticity for the NFT 116). In general, blocks are added to the blockchain 120 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 120, which is automatically downloaded to the node upon joining the peer-to-peer network. The blockchain protocol provides a secure and reliable method of updating the blockchain 120, copies of which are distributed across the peer-to-peer network, without use of a central authority.

The infrastructure described above may be accessed by an application program interface (API). The API may be accessed from an access node. The API may provide users with an interface to the NFTs 116. The API may be loaded as an interface in an access node, or a resource available on the internet that may be accessed using a network application (e.g., a browser) in the access node of the system 104. The API may convert the state and the functions of an online NFT transaction to binary code for storage and execution by miners of the blockchain 120. The API may also convert (e.g., compile) transactions or information requests to a binary message that may be transmitted to the blockchain 120 for execution by miners.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 120 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 120). In certain embodiments, the blockchain 120 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 120 based on the blockchain protocol. In general, multiple miners validate transactions that are to be added to a block, and compete (e.g., perform work, as introduced above) to have their block added to the blockchain 120. Validation of transactions includes verifying digital signatures associated with respective transactions. For a block to be added to the blockchain 120, a miner must demonstrate a proof of work before their proposed block of transactions is accepted by the peer-to-peer network, and is added to the blockchain 120. In certain embodiments, the blockchain protocol includes a proof of work scheme that is based on a cryptographic hash function (CHF). In general, the CHF receives information as input, and provides a hash value as output, the hash value being of a predetermined length. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 120, details of the transaction(s) that are to be included in the to-be-created block, and a nonce value (e.g., a random number used only once).

Multiple nodes may compete to hash a set of transactions and provide the next block that is to be added to the blockchain 120. In certain embodiments, the blockchain protocol provides a threshold hash to qualify a block to be added to the blockchain 120. For example, the threshold hash may include a predefined number of zeros (0s) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 120. Consequently, the respective miner's block is broadcast across the peer-to-peer network. All other miners cease work (because one miner was already successful), and all copies of the blockchain 120 are updated across the peer-to-peer network to append the block to the blockchain 120. Each miner may be required to produce hundreds or thousands of hash values, before any one miner provides a qualifying hash value (e.g., at least the first four characters of the hash value are each zero).

In certain embodiments, the distributed ledger (or blockchain 120) system may include one or more sidechains. A sidechain may be described as a blockchain 120 that validates data from other blockchains 120. In certain embodiments, a sidechain enables ledger assets (e.g., a digital currency) to be transferred between multiple blockchains 120. In certain embodiments, the blockchain 120 may be a public blockchain, such that data stored on the blockchain 120 is generally accessible. In other embodiments, the blockchain 120 may be a private blockchain, such that the stored data is accessible only to authorized individuals and/or processes on the blockchain 120. In certain embodiments, the blockchain 120 may also be a hybrid of public and private blockchains. For example, the NFT management system 104 may utilize a privately managed, but publicly readable blockchain 120. In this manner, some identity information about a user may be stored in a sidechain. In certain embodiments, the NFT management system 104 may store multiple different NFTs 116 associated with respective different users 102.

Figure 2:
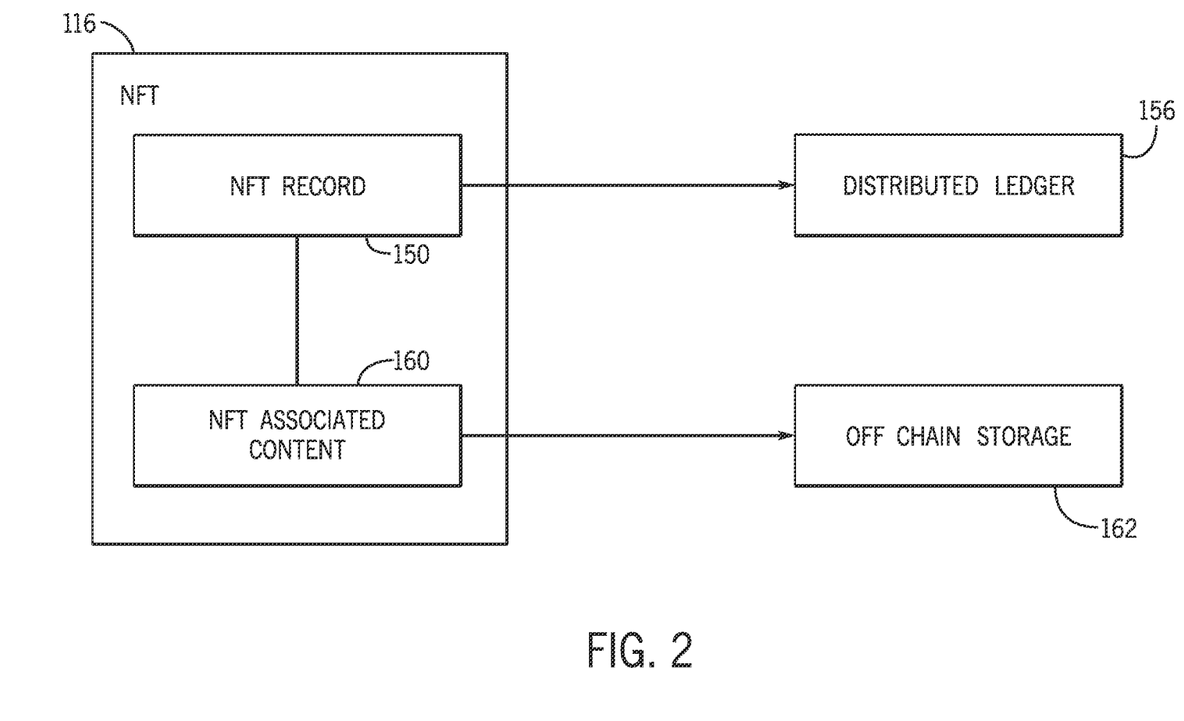
FIG. 2 is a block diagram of a non-fungible token storage arrangement, in accordance with an embodiment.

FIG. 2 shows an example NFT 116 and storage arrangement that includes an NFT record 150, e.g., a token, such as a hash, that is stored and validated in a distributed ledger 156, e.g., a blockchain record. The NFT record 150 includes ownership information and transaction histories. The NFT record 150, as discussed herein, includes a unique identification that uniquely identifies NFT associated content 160, which can be one or more files that includes the digital data of the NFT 116, such as image files, video files, audio files, game item files, or any suitable NFT associated content 160. The NFY associated content 160 may include metadata. While the NFT record 150 is stored in the distributed ledger 156, e.g., a blockchain, storing the NFT associated content 160 in a distributed ledger format may be prohibitively expensive, particularly for larger files. Accordingly, NFT associated content 160 can be stored in an off-chain storage 162. The location of the off-chain storage 162 at the time the NFT 116 was minted can be specifically referred to in the NFT record 150. For example, the NFT record 150 can include a url link to the NFT associated content 160.

In certain embodiments, the NFT 116 may include seed information that populates variables for a fixed NFT generation algorithm, e.g., an image or audio generation algorithm. Each seed can be a hexadecimal string generated in a random or pseudorandom manner at the time the token is minted. However, the algorithm is fixed, such that using a specific seed provides identical result each time. In embodiments, the seed can be stored as part of the NFT record 150 on the distributed ledger 156. The algorithm can be stored as part of the NFT record 150 and/or stored in off-chain storage 162. In this manner, the NFT associated content 160 can be generated on demand using the algorithm and the seed. This may permit greater on-chain storage capabilities, without requiring storage of large data files that are expensive to mint. The seed, and algorithm in embodiments, can be relatively small and inexpensive to record in the distributed ledger 156.

Off-chain storage 162 solutions are typically set by the minter of the NFT 116, and can vary in quality and security. For example, the off-chain storage can be a website, and the NFT record 150 can refer to an HTTP address. However, website access can be shut down if the account holder abandons the site. Further, the owner of the website can alter or replace the original NFT associated content 160. Other storage solutions may be longer-term or more stable, such as storage in InterPlanetary File System (IPFS) or Arweave. In IPFS storage, any added file is given its own unique identifier that acts as a permanent record of the file. Therefore, NFT associated content 160 stored off-chain in an IPFS storage may have a unique token identifier as part of the NFT record 150 and may also have a storage record, such as a content identifier (CID), as part of the stored file in the off-chain storage 162. Accordingly, different NFTs 116 may have different data persistence or mutability based on the quality of the off-chain storage 162.

The NFT purchaser may wish to store the NFT 116 privately to create scarcity of the NFT associated content 160. In an embodiment, the NFT management system 104 can include off-chain storage 162 with controlled or user-set access for managed NFTs 116. Thus, the NFT management system 104 addresses uncertainties caused by an unsecured link between the NFT record 150 and the NFT associated content 160.

Further, the purchaser of the NFT 116 may be at arms length from the original creator (minter) of the NFT 116 and may not have any way of contacting the creator to alter the storage arrangements or authenticate the NFT associated content 160. Disclosed embodiments of the NFT management system 104 include improved authentication of the NFT associated content 160 for downstream purchasers of the NFT 116, which in turn may permit controlled storage of an authenticated copy of the NFT associated content 160. A user of the NFT management system 104 may wish to control storage of a purchased NFT 116 or have access to an authenticated copy of the associated content 160 that is stored in a secure storage location.

Figure 3:
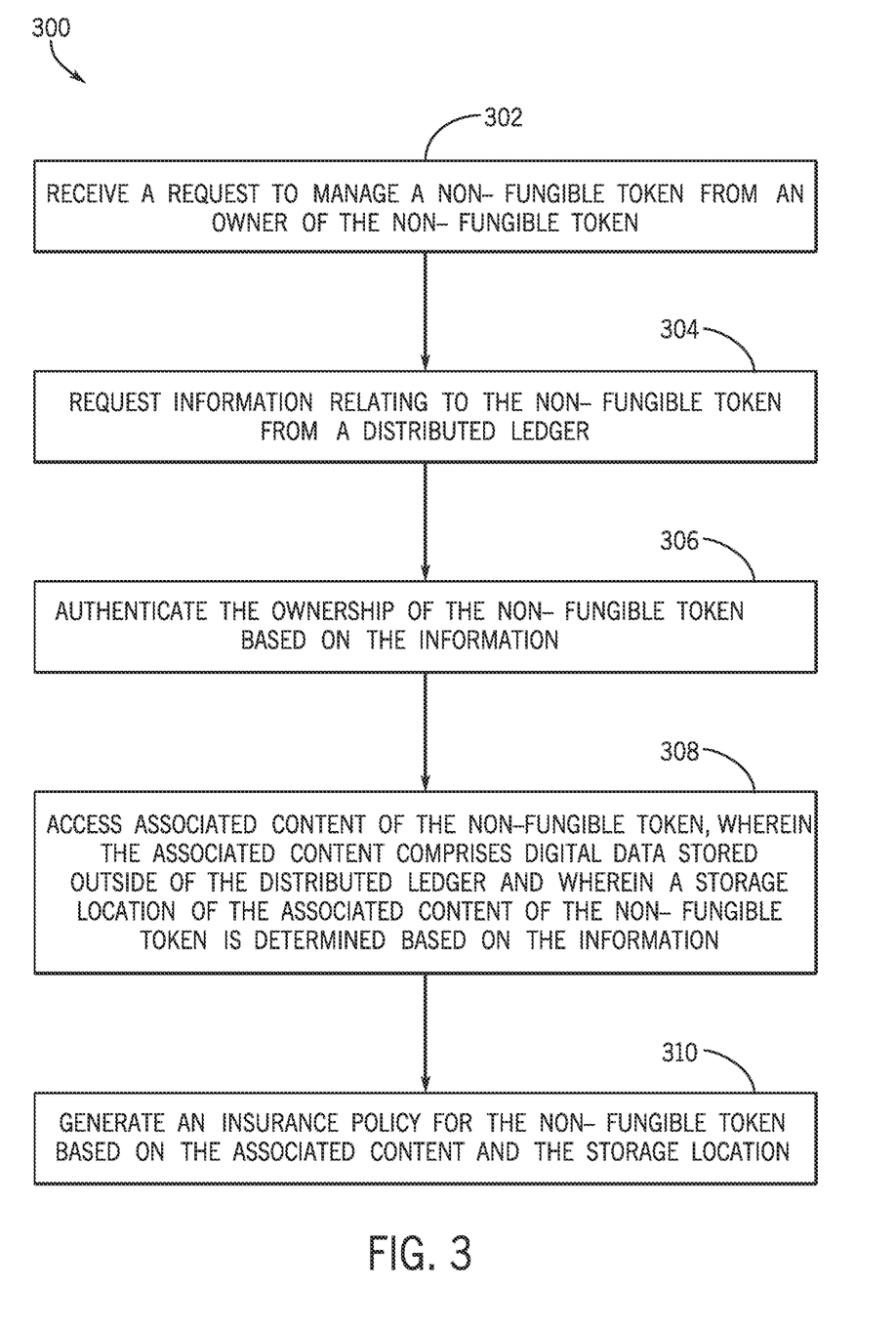
FIG. 3 is a flow diagram of method of non-fungible token management, in accordance with an embodiment.

FIG. 3 is a flow diagram of a method 300 of NFT management. Although the following description of the method 300 is described as being performed by the NFT management system 104, the method 300 may be performed by any suitable computing system and may include communication with other devices or entities as provided herein. In addition, although the method 300 is described in a particular order, it should be understood that the method 300 may be performed in any suitable order.

The method includes receiving, e.g., by the NFT management system 104, a request to manage an NFT 116 from an owner of the NFT 116 at block 302. The request may include a reference to the NFT record 150 of the NFT 116, which can be accessed via a distributed ledger (block 304). The received request may trigger an owner authentication step (block 306) in which 1) the identity of the requestor is verified and 2) the requestor is verified to be the owner of the NFT 116 based on the NFT record 150.

The method 300 includes a step of accessing, or attempting to access, associated content 160 of the NFT 116. The associated content includes digital data stored outside of the distributed ledger (e.g., that is not part of the NFT record 150). A storage location of the associated content 160 of the NFT 116 is determined based on the NFT record 150.

As provided herein, the NFT management system 104 may assess the off-chain storage 162 and provide a valuation metric for the NFT 116 based on the off-chain storage 162 of the NFT associated content 160. Further, the NFT management system 104 may also provide an authentication metric based on the potential mutability of the NFT associated content 160 in the off-chain storage 162. While files systems such as IPFS may provide secure storage, IPFS files are public and accessible. In addition, the NFT record 150, which is set by the NFT creator, may refer to an intermediate gateway to the IPFS file rather than the IPFS hash itself. The intermediate gateway may have a greater chance of being unstable or unmaintained. Further, the file in the IPFS is hosted by a node, which may no longer be hosted. Therefore, the IPFS file for the NFT associated content 160 may also be inaccessible over time. In one example, the link referred to in the NFT record 150 may be broken. Thus, the method 300 may generate a notification that the NFT 116 cannot be managed by the system 104 based on a broken relationship between the NFT record 150 and the associated content 160. Further, the system 104 may offer solutions for repairing the broken link between the NFT record 150 and the associated content 160 via updated authentication (see FIGS. 4-5) and/or offers to host the NFT associated content 160 in storage of the system 104. In another example, the system 104 may access the NFT associated content 160 from the link and compare the NFT associated content 160 to a thumbnail or image of the NFT 116 in the marketplace. If there is a mismatch, indicating that the hosted NFT 116 does not match the image that is advertised for sale, the system 104 can trigger an alert or flag. In one example, the system 104 may block sale of a particular NFT 116 that has a broken link and/or an image (or other digital data) mismatch between the advertised image and the image in the referenced link.

The NFT management system 104 assesses the NFT record 150 to determine if, for example, the NFT record 150 includes reference to a IPFS hash (or other direct reference to a file identifier of the off-chain storage 162) or to an intermediate URL and may assess a first storage value and a second storage value, respectively based at least in part on storage assessment. The first storage value can be a higher weight for strong or stable storage while the second storage value can be a lower weight for weaker storage. The NFT management system 104 may generate an insurance policy for the NFT 116 (block 310) based on the associated content 160 and the storage location, e.g., an assigned storage value linked to the storage location. The storage may be evaluated for potential hacking, loss of power, natural disaster, and so forth.

In an embodiment, the NFT management system 104 can adjust insurance policy rates or provide a discount if the NFT associated content 160 is stored on-chain or is based on a seed and/or generation tool that is stored on-chain. In an embodiment, the NFT management system 104 can adjust insurance policy rates or provide a discount if the NFT associated content 160 is stored by the NFT management system 104. In an embodiment, the NFT management system 104 can set insurance policy rates and/or transaction fees based on an estimated NFT value, as provided herein.

In an embodiment, the NFT management system 104 can perform an NFT valuation estimate and provide the estimate to a user. The valuation may be for an NFT 116 owner by the user or under consideration for purchase by the user. Valuation of the NFT 116 may be based on purchase price history, and an estimate of future NFT value, which may include inputs of other NFT assessment factors as provided herein, such as uniqueness factors or ubiquity factors, changes in price of related NFTs, and/or prices of real-world items that are linked to the NFT 116. In one example, the NFT 116 may be part of a series, such as an Art Blocks series, that is locked. Thus, no new related NFTs 116 can be minted using the original algorithm. The value of an individual NFT 116 of the series may be based on other members of the series as well as the individual qualities of the particular NFT 116. The algorithm may generate a subset of rare NFTs 116 within a series that have higher valuation than the more common NFTS 116. The rare and common attributes are set by the algorithm and vary from series to series. However, rare NFTs 116 from a series can be valued based on a combination of the overall value of the series as well as a rareness value or metric. In another example, a retail organization can issue NFTs 116 for clothing items. Each NFT 116 includes a smart contract that permits only the owner of the NFT 116 to special order the clothing item associated with a design in the NFT 116. The estimated value of the NFT 116 may be set based on the value of other NFTs 116 for similar items offered by the retail organization and the value of real-world clothing items made using designs of the NFTs 116 from the retail organization. The system 104 can manage an NFT 116 until the NFT 116 reaches an estimated predetermined value, and then offer the NFT for sale once the predetermined value is reached.

Figure 4:
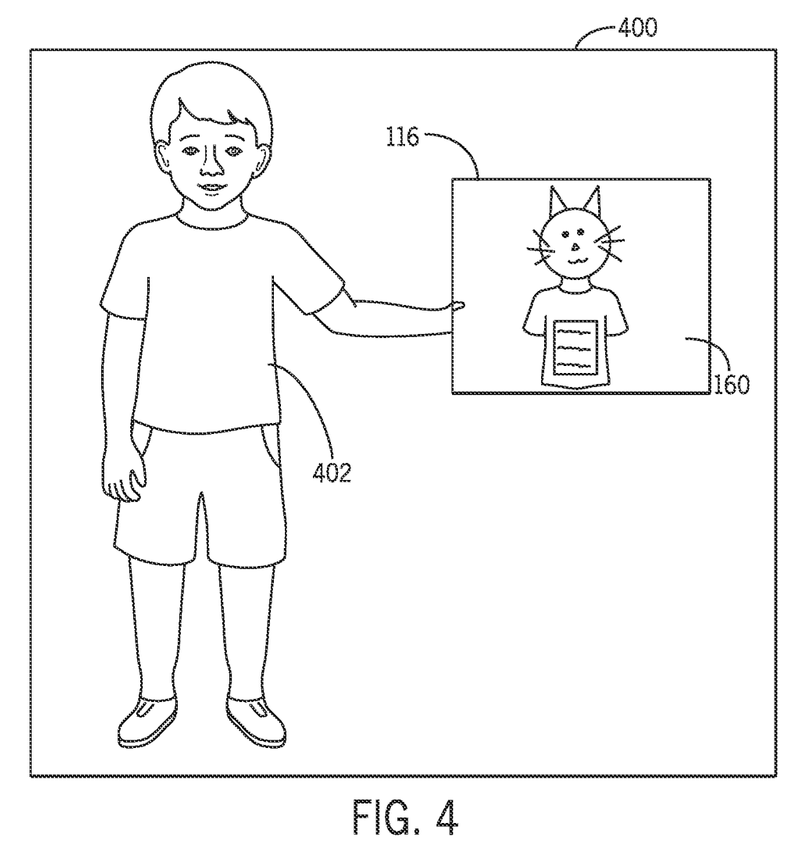
FIG. 4 is a schematic illustration of a non-fungible token authentication image, in accordance with an embodiment.

A challenge in managing NFTS 116 is that the associated content 160 is typically stored in a different location than the NFT record 150, which is stored in the distributed ledger (e.g., the blockchain 120). Thus, it is difficult to determine if the link referred to in the NFT record 150 is authentically the NFT associated content 160, or if the associated content 160 has been altered or replaced. The system 104 may certify authenticity and ownership. In an embodiment, as illustrated in FIG. 4, the system 104 may store an image 400 of the NFT owner 402 posing with the NFT 116 (e.g., when the associated content 160 is an image or includes images) or with an authentication certificate or stamp from the system 104 certifying ownership and/or authenticity. Thus, the image 400 can be referenced as part of ownership and/or authentication data for the NFT 116 to show the provenance of the NFT 116.

Figure 5:
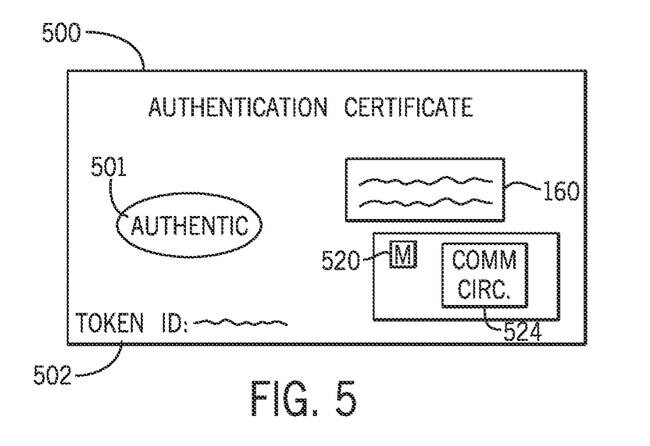
FIG. 5 is a schematic illustration of a non-fungible token authentication stamp, in accordance with an embodiment.

The authentication certification may be virtual or physical. FIG. 5 is an example of a physical authentication certificate 500 that includes a stamp 501 or other authenticity indicator. The certificate 500 permits electronic, visual, and/or physical identification of the NFT 116 as having been authenticated by the management system 104. The certificate 500 may include identifying information of the issuing entity. The certificate 500 may include printed token identification 502 for the NFT 116 and, in embodiments, a reproduction of the associated content 160 of the NFT 116 on the face of the certificate 500. The certificate 500 may include hardware elements, such as a memory 520 storing a copy of the associated content 160 and NFT metadata representative of the NFT record 150. The certificate 500 may also include communication circuitry 524, such as an RFID transceiver, to permit scanning of the certificate 500 to extract the copy of the NFT associated content 160 and the copy of the NFT record 150 to identify the NFT 116 authenticated by the certificate 500. Features of the certificate 500 may additionally or alternatively be implemented virtually. The certificate 500 may be encrypted and may use a public/private key to allow confirmation. Ownership confirmation may also be done via public/private key. In an embodiment, a physical copy or a virtual copy of the certificate 500 is provided to the owner or a potential buyer of the NFT 116.

Figure 6:
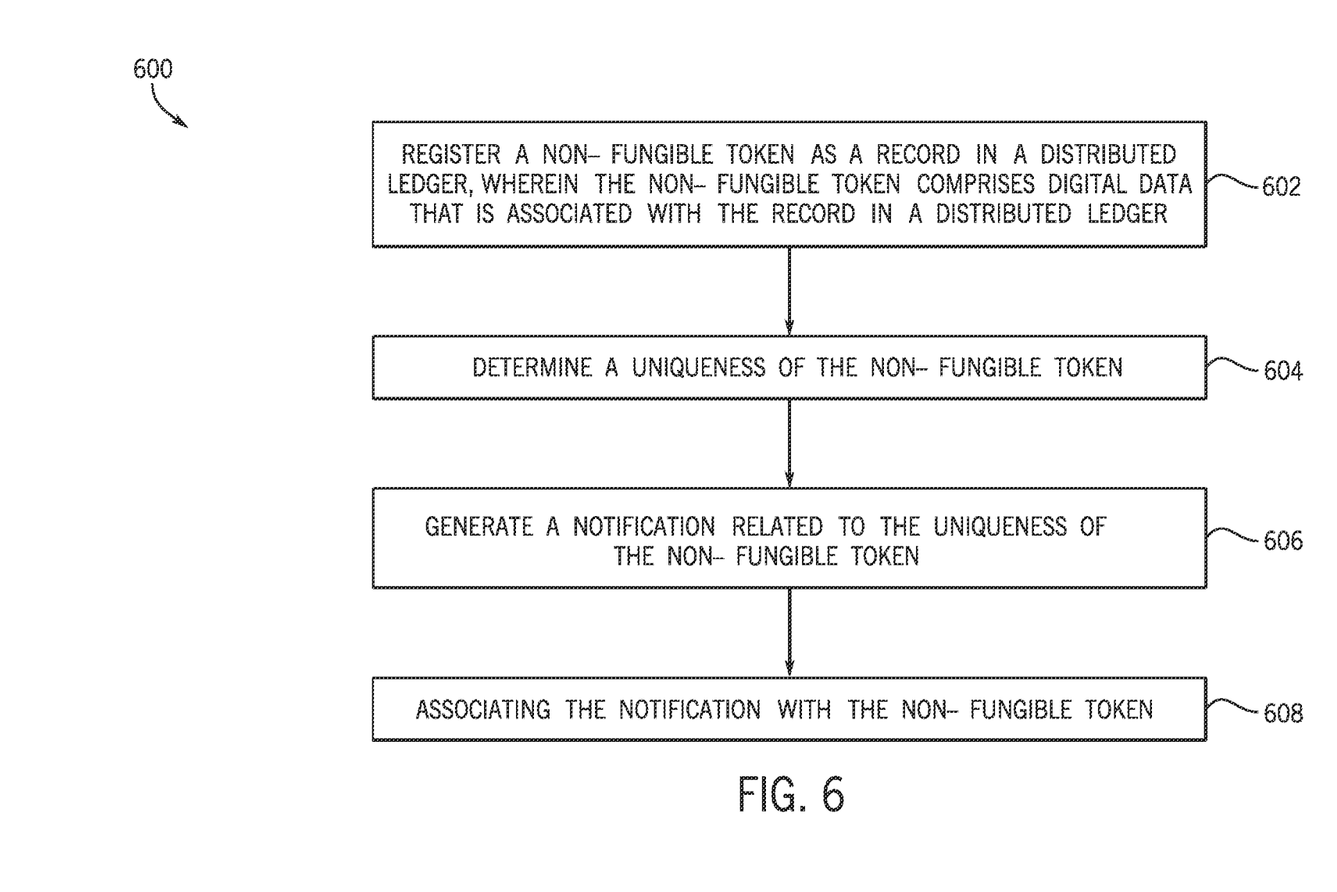
FIG. 6 is a flow diagram of method of non-fungible token management, in accordance with an embodiment.

FIG. 6 is a flow diagram of a method 300 of NFT management. Although the following description of the method 600 is described as being performed by the NFT management system 104, the method 600 may be performed by any suitable computing system and may include communication with other devices or entities as provided herein. In addition, although the method 600 is described in a particular order, it should be understood that the method 600 may be performed in any suitable order.

The method 600 includes a step of registering the NFT 116 as a record (e.g., NFT record 150) in a distributed ledger (block 602). The NFT 116 includes digital data (e.g., associated content 160) that is associated with the record in a distributed ledger. The registering may be minting or creating the NFT 116. The registering may additionally or alternatively be purchasing an existing NFT 116. Each transaction is recorded as a block in the distributed ledger. The method includes a step of determining a uniqueness of the NFT 116 (block 604) and generating a notification related to the determined uniqueness of the NFT (block 606). In an embodiment, the method 600 may associate the notification with the NFT 116 in a public or private manner. In one example, the uniqueness determination can be part of the record of the NFT 116 within a marketplace of the system 104 or a marketplace serviced by the system 104. Because the marketplace is dynamic, the determination can be made de novo on a periodic basis.

In an embodiment, the uniqueness determination is based on the uniqueness of the NFT record 150, e.g., blockchain signature and/or metadata relating to the NFT record 150 and/or the uniqueness of the NFT associated content 160. The uniqueness of the NFT record 150 may be based on scanning a blockchain and identifying signatures or other information in appropriate blocks, which can eliminate fakes with slightly modified blockchains. A user of the system 104 may wish to purchase a particular NFT 116. The marketplace can be searched to bring up the NFT record 150, including the identification number, and the system 104 can perform a check of scanning the NFT record 150 to ensure that the NFT 116 has the desired identification number and is not a slightly modified version. NFT records 150 consisting of alphanumeric strings can be searched using a text-based search.

In an embodiment, the user may search NFT marketplaces by NFT attribute keywords, creator information, hashtags, etc. In such an example, it may be difficult to determine if keyword-matching NFTs 116 brought up by such searches are authentic or unique in the marketplace or if the seller of an offered NFT 116 has improperly copied the NFT 116 created by another entity. The uniqueness determination within the marketplace can help the user assess risks of ownership. Thus, searching for matches within the marketplace or a web of marketplaces for matching NFT associated content 160 can help identify copy risks. If a particular image of the NFT associated content 160 pulls up exact matches, there may be question as to who is the authorized seller for the NFT 116.

The system 104 can provide authorization or certification based on authentication assessment as provided herein, and the certification can be encoded in the blockchain or in the metadata. That is, an owner of a particular NFT 116 can contract with the system 104 to apply an ownership stamp to the NFT record 150 in the blockchain. Any matching NFTs 116 without the stamp are more likely to be fake. In one embodiment, the system 104 can preferentially rank or preferentially display search results for certified/authorized NFTs 116 from the universe of matches. For example, if a particular NFT 116 search brings up ten identical images, the system 104 can scan their blockchain records for an authentication stamp or a reference to an authentication stamp in the NFT metadata and rank authenticated records at the top or grey-out nonauthenticated NFTs 116. Thus, the user is steered towards authenticated NFTs 116.

Figure 7:
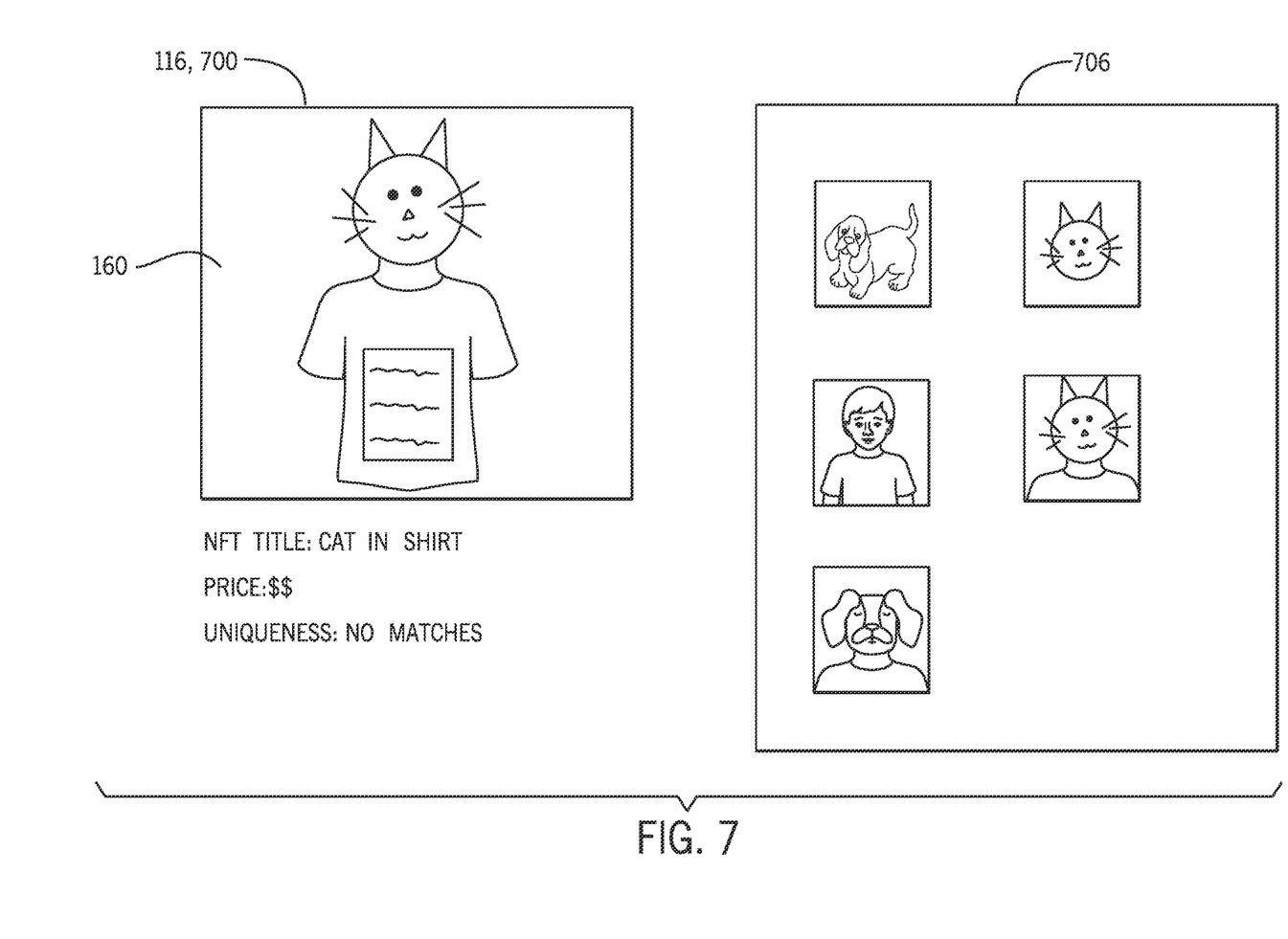
FIG. 7 is a schematic illustration of a non-fungible token uniqueness assessment, in accordance with an embodiment.

In addition to assessing duplication of NFTs 116 within a marketplace, indicating potentially fraudulent sales, a potential buyer of an NFT 116 may wish to know how unique or ubiquitous a particular NFT 116 is as a measure of value. The uniqueness assessment can be relative to other NFTs 116 in a similar category, available for sale in one or more market places, or relative to a set of publically available digital files. In some embodiments, images that are highly saturated throughout the internet can be more valuable, such as images associated with high profile products or celebrities. FIG. 7 show an example uniqueness determination for the NFT 116 in which the NFT associated content 160 is a digital image 700. The NFT 116 may be an image 700 or may include images from a video file. In one example, the NFT 116 is provided as an item for sale in an NFT marketplace that is part of or that interact with the NFT management system 104. A potential purchaser may wish to know if the digital image 700 of the NFT 116 is unique or widespread throughout the internet. The NFT management system 104 can provide a uniqueness metric of the digital image 700. The uniqueness metric may be assessed based on uniqueness throughout the internet (i.e., publically available images) or the NFT marketplace.

In one embodiment, the image similarity is based on a reverse image search of the NFT image 700 to bring up a set 706 of closest match images. Image similarity can be based on identification of features that can be used to describe the image content and the similarity of two images based on the feature space. An image's feature space can be for the entire image or just for a small group of pixels within the image, such as regions or objects (e.g., only a face for facial recognition, only text in text-recognition). Image similarity may be assessed by Structural Similar Index Measure (SSIM), Feature Similarity Indexing Method (FSIM), Information theoretic-based Statistic Similarity Measure (ISSM), Signal to Reconstruction Error ratio (SRE), Spectral Angle Mapper (SAM), or Universal Image Quality index (UIQ) by way of example. If none of the set 706 is an exact match, the uniqueness metric (which can be on an arbitrary scale) can be set to a highest value. The scale of the uniqueness metric may be centered around an average of NFTs 116 managed in the system 104 or available for sale in a marketplace. Thus, each marketplace may have a most unique image and a set of less unique images.

While FIG. 7 shows an example of evaluating uniqueness of the image 700, the associated content 160 of the NFT 116 may additionally or alternatively include audio data. The audio data may be compared to an audio database of publically available audio files, and unique files with no matches can be provided with a uniqueness metric or a designation of uniqueness.

Figure 8:
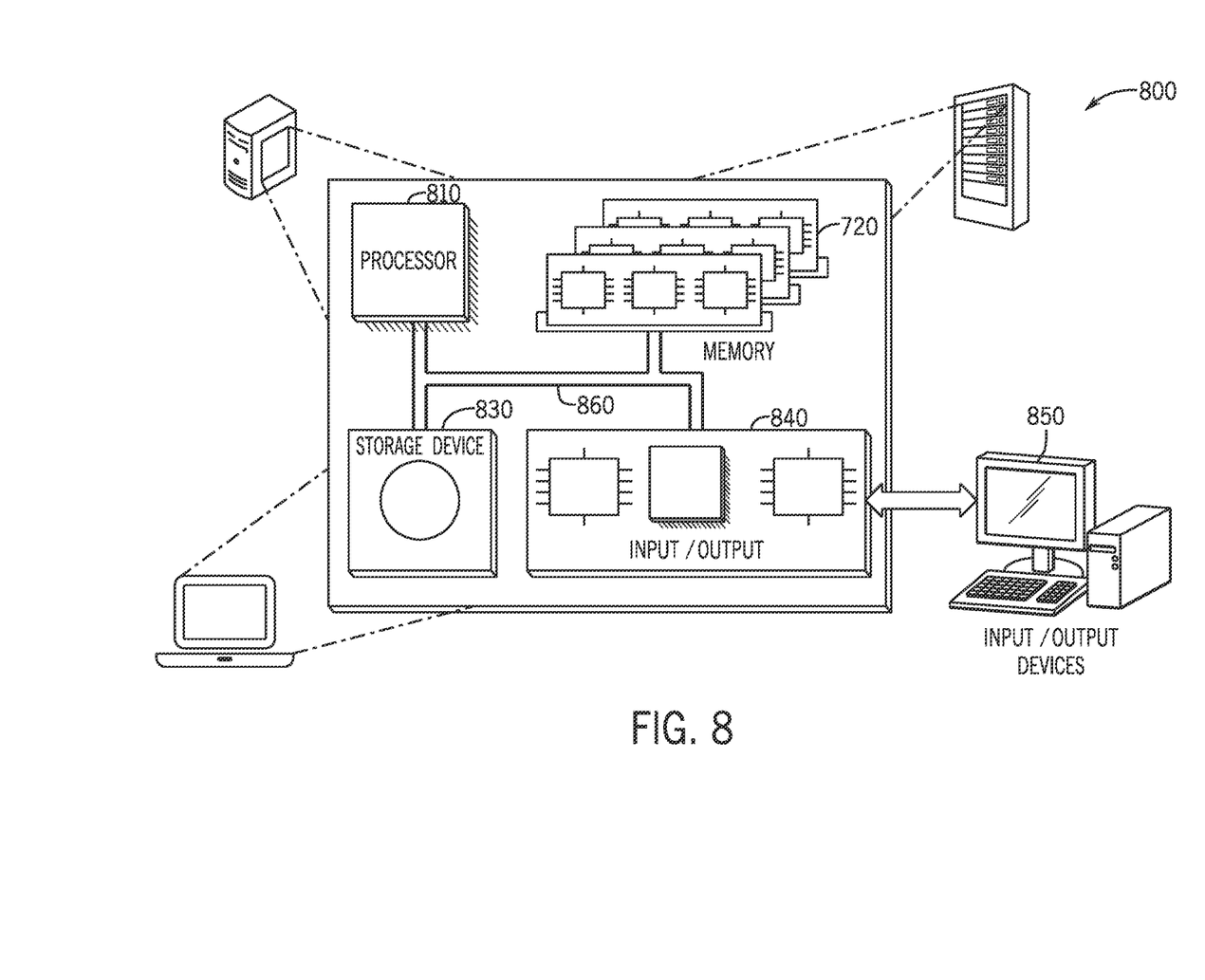
FIG. 8 is a schematic illustration of an example computing system, in in accordance with an embodiment.

FIG. 8 illustrates an example computing system 800 that the embodiments described herein may use to perform their respective operations. The system 800 may be used for any of the operations described with respect to the various embodiments described herein, including the NFT management system 104 described herein. For example, the system 800 may be included, at least in part, in one or more of computing device(s) or system(s) described herein. In certain embodiments, the system 800 may include one or more processors 810, one or more memory 820, one or more storage devices 830, and one or more input/output (I/O) devices 850 controllable via one or more I/O interfaces 840. The various components 810, 820, 830, 840, or 850 may be interconnected via at least one system bus 860, which may enable the transfer of data between the various modules and components of the system 800.

In certain embodiments, the processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. For example, the processor(s) 810 may execute instructions for the various software module(s) described herein. The processor(s) 810 may include hardware-based processor(s) each including one or more cores. The processor(s) 810 may include general purpose processor(s), special purpose processor(s), or both.

In certain embodiments, the memory 820 may store information within the system 800. In certain embodiments, the memory 820 includes one or more computer-readable media. The memory 820 may include any number of volatile memory units, any number of non-volatile memory units, or both volatile and non-volatile memory units. The memory 820 may include read-only memory, random access memory, or both. In certain embodiments, the memory 820 may be employed as active or physical memory by one or more executing software modules.

In certain embodiments, the storage device(s) 830 may be configured to provide (e.g., persistent) mass storage for the system 800. In certain embodiments, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In certain embodiments, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 810 and the memory 820 may be supplemented by, or incorporated into, one or more application-specific integrated circuits (ASICs).

In certain embodiments, the system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800 or may be external on one or more computing devices of the system 800.

In certain embodiments, the system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-832 standard for serial ports, or with a version of the IEEE AA884 standard for parallel ports. As another example, the I/O interface(s) 840 may be configured to provide a connection over Universal Serial Bus (USB) or Ethernet. In certain embodiments, the I/O interface(s) 840 may be configured to provide a serial connection that is compliant with a version of the IEEE AA994 standard.

In certain embodiments, the I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more communication networks using any network protocol.

Computing devices of the system 800 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS)

receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 800 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 800 that includes a back-end component, e.g., as a data server, or that includes a middleware component, e.g., an application server, or that includes a front-end component, e.g., a client computer having a graphical user interface or a web browser through which a user may interact with an with the system 800, or any appropriate combination of one or more such back-end, middleware, or front end components. The components of the system 800 may be interconnected by any appropriate form or medium of digital data communication, e.g., a communication network. Examples of communication networks include a local area network ("LAN") and a wide area network ("WAN"), e.g., the Internet.

In certain embodiments, the computing system 800 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as transaction history that is stored on the distributed ledger. In certain embodiments, a history may provide an auditable history of transactions, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 120.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system. For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for managing a non-fungible token, comprising:
   a physical authentication certificate associated with the non-fungible token, wherein the non-fungible token comprises digital data that is associated with a record in a distributed ledger and wherein the physical authentication certificate comprises:
   a memory;
   an RFID transceiver; and
   a printed indication of the digital data; and
   a processor configured to process instructions comprising:
   registering the non-fungible token as the record in the distributed ledger;
   determining a uniqueness metric of the non-fungible token;
   transmitting the uniqueness metric and a copy of the digital data to be written on the memory of the physical authentication certificate, wherein the RFID transceiver, when scanned by a reader, retrieves the uniqueness metric and the copy of the digital data from the memory;
   generating a notification related to the uniqueness metric of the non-fungible token; and
   associating the notification with the non-fungible token.

2. The system of claim 1, wherein the digital data comprises image data, and wherein the processor is instructed to determine the uniqueness metric of the non-fungible token by searching an image database for a closest match to the image data.

3. The system of claim 1, wherein the digital data comprises image data, and wherein the processor is instructed to determine the uniqueness metric of the non-fungible token by performing a reverse image search.

4. The system of claim 1, wherein the digital data comprises audio data, and wherein the processor is instructed to determine the uniqueness metric of the digital data by searching an audio database for a closest match to the audio data.

5. The system of claim 1, wherein the processor is instructed to determine the uniqueness metric by generating a first value when the digital data has no matches in a database or a second value when the digital data has at least one match in the database.

6. The system of claim 1, wherein the processor is instructed to determine the uniqueness metric of the non-fungible token by scanning the distributed ledger and identifying a presence of matches in other records of the distributed ledger.

7. The system of claim 1, wherein the processor is configured to execute the instructions to provide the uniqueness metric as part of metadata of the non-fungible token.

8. The system of claim 1, wherein the processor is configured to execute the instructions to authenticate the non-fungible token.

9. The system of claim 8, wherein the processor is instructed to authenticate the non-fungible token by verifying a blockchain record of the non-fungible token in the distributed ledger.

* * * * *